United States Patent [19]

Christenson et al.

[11] 4,065,416
[45] Dec. 27, 1977

[54] WATER-BASED COATINGS WITH REDUCED SOLVENT OR WATER POPPING AND SAGGING

[75] Inventors: Roger M. Christenson, Gibsonia, Pa.; Clarence E. Evjen, Williston, N. Dak.

[73] Assignee: PPG Industries, Inc., Pittsburgh, Pa.

[21] Appl. No.: 618,584

[22] Filed: Oct. 1, 1975

[51] Int. Cl.$^2$ .............................................. C08L 33/02
[52] U.S. Cl. .................. 260/17.4 SG; 260/29.4 UA; 260/29.6 NR; 260/29.6 TA; 260/29.6 E
[58] Field of Search ............... 260/29.6 NR, 29.6 TA, 260/29.6 E, 17.4 SG, 29.4 UA

[56] References Cited

U.S. PATENT DOCUMENTS

| | | | |
|---|---|---|---|
| 3,079,434 | 2/1963 | Christenson et al. | 260/836 |
| 3,085,085 | 4/1963 | Wismer et al. | 260/209 |
| 3,288,740 | 11/1966 | Maeder et al. | 260/29.6 TA |
| 3,652,478 | 3/1972 | Ishii et al. | 260/29.6 NR |
| 3,860,549 | 1/1975 | Sekmakas | 260/29.6 TA |
| 3,959,202 | 5/1976 | Blank | 260/29.4 UA |

*Primary Examiner*—M. J. Welsh
*Attorney, Agent, or Firm*—Frank J. Troy; Charles R. Wilson

[57] ABSTRACT

This invention relates to a water-based coating composition in which solvent or water popping and sagging are eliminated or substantially reduced. The composition comprises a thermosetting, film-forming organic binder dispersed in an aqueous medium containing from 60 to 100 parts by weight of water and from 0 to 40 parts by weight of a volatile organic solvent. The organic binder is formulated from (a) an acid-containing interpolymer adapted to be dissolved or dispersed in water with the aid of a base and (b) a water-soluble or water-dispersible polyether polyol or polyester polyol having a molecular weight of at least 300. The interpolymer consists essentially of the interpolymerization product of an N-alkoxyalkyl-substituted amide, an alpha, beta-ethylenically unsaturated carboxylic acid, and at least one other monomer containing a

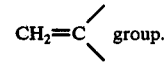 group.

In addition to the elimination of, or substantial reduction in solvent or water popping and sagging of the composition, films formed from the compositions exhibit good properties, such as hardness, water resistance, salt spray resistance and stain resistance.

10 Claims, No Drawings

WATER-BASED COATINGS WITH REDUCED SOLVENT OR WATER POPPING AND SAGGING

BACKGROUND OF THE INVENTION

In recent times, the increased emphasis on environmental pollution problems has affected all areas of society. In the coatings industry, this emphasis has taken the form of a major effort to eliminate or substantially reduce organic solvent emissions from coating compositions. This has led to an increasing interest on the part of the coatings industry in water-based coatings in which organic solvents are eliminated or at least greatly reduced. In even more recent times, this interest in water-based coatings has received added impetus as a result of the energy shortage, particularly the decline in U.S. oil production and the high cost of imported oil.

Water-based coating compositions derived from interpolymers of substituted, carboxylic acid amides, alpha, beta-ethylenically unsaturated carboxylic acids, and other ethylenically unsaturated monomers are known in the art, e.g., see U.S. Pat. No. 3,247,139 issued Apr. 19, 1966, and Example XV of U.S. Pat. No. 3,079,434, issued Feb. 26, 1963. However, the water-based coating compositions of the aforementioned patents differ materially in composition from the compositions of this invention in that the compositions described in the aforementioned patents do not contain a polyol component. Moreover, while the compositions mentioned in these patents are useful in certain applications they have been found to exhibit a number of serious disadvantages which materially limit their usefulness. Thus, the compositions of the aforementioned patents and, for that matter, water-based coatings in general, have been found to be very susceptible to solvent or water popping and sagging, or "curtaining", particularly when relatively thick films are deposited therefrom. Solvent or water popping manifests itself in the form of bubbles or pinholes in the cured film surface. Water-based coating compositions such as those described in the above-mentioned patents also tend to have lower than desired water and humidity resistance.

The exact cause of solvent or water popping is not known with centitude, but two theories have been advanced. One theory is that the film sets up structurally, or actually begins to crosslink before the last portion of the solvent or water is eliminated. This residual solvent or water cannot evaporate through the tough surface film and collects in tiny bubbles which may or may not rupture, depending upon the curing conditions.

Another theory is that as the resin cures, the water and/or alkanol given off during the crosslinking cure process is actually entrained under the film surface in the form of tiny bubbles.

Sagging or "curtaining" occurs when relatively thick films of the coating composition are applied to other than horizontal surfaces and is due to gravitational flow of the film, and/or to film resoftening during the curing period. In the coatings art, the term "sagging" denotes the tendency of a film to drain or flow from a non-horizontal surface in an uneven manner, while the term "curtaining" denotes the tendency of the film to drain or flow from said surface in a smooth, continuous manner.

Very recently, water-based coating compositions comprising methylolated amide interpolymers of high acid content and low molecular weight polyhydric alcohols have been disclosed in U.S. Pat. No. 3,860,549 to Sekmakas, issued Jan. 14, 1975. However, the compositions of the aforementioned patent are limited specifically to interpolymers derived from methylolated amides, which are unetherified, and thus differ materially from the compositions of the invention herein. The compositions of the aforementioned patent also exhibit serious disadvantages. Thus, compositions derived solely from methylolated amide interpolymers tend to exhibit short potlife and be prone to gellation.

In accordance with this invention, a water-based coating composition is provided which overcomes substantially all of the disadvantages referred to above. Thus, the water-based coating composition of the invention is one in which solvent popping or sagging is eliminated or at least substantially reduced. Moreover, since the compositions of the invention are based on n-alkoxyalkyl-substituted amides (i.e., etherified amides) they exhibit excellent stability.

Description of the Invention

The water-based coating compositions of the invention comprise a thermosetting, film-forming organic binder dispersed in an aqueous medium which ordinarily contains from about 60 to 100 parts by weight of water and from 0 to 40 parts by weight of a volatile organic solvent. The water-reducible organic binder of the composition is formulated from (A) an acid-containing interpolymer adapted to be dissolved or dispersed in water with the aid of a base and (B) a water-soluble or water-dispersible polyether polyol or polyester polyol having a molecular weight of at least about 300.

A. The Acid-Containing Interpolymer Component

The interpolymer component of the compositions of the invention consists essentially of the interpolymerization product of an N-alkoxyalkyl-substituted amide, an alpha, beta-ethylenically unsaturated carboxylic acid and at least one other monomer containing a

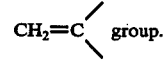

group.

The N-alkoxyalkyl-substituted amides employed in forming the interpolymer herein may be represented by the structure:

wherein R' is an aliphatic hydrocarbon radical containing from 2 to 6 carbon atoms and having a single polymerizable alpha, beta-ethylenically unsaturated group and R is a lower alkyl radical containing from 1 to 8 carbon atoms.

These substituted amides can be prepared by reacting an unsaturated amide (e.g., acrylamide) with formaldehyde and an alkanol (e.g., butanol) under acidic conditions and in the presence of a polymerization inhibitor. For a detailed description of this method, see U.S. Pat. No. 3,079,434, incorporated herein by reference. The resultant N-alkoxyalkyl-substituted amide [e.g.,N-(butoxymethyl)acrylamide] is then interpolymerized with the other monomers (described below) to form the interpolymer containing the substituted amide units.

The preferred N-alkoxyalkyl-substituted amide employed in forming the interpolymer is N-(butoxymethyl)acrylamide, although other N-alkoxyalkyl substituted unsaturated carboxylic acid amides such as N-(methoxymethyl)acrylamide, N-(propoxymethyl)acrylamide, N-(isopropoxymethyl)acrylamide, N-(isobutoxymethyl)acrylamide and N-(butoxymethyl)methacrylamide, or the like may be employed.

The interpolymer may contain in polymerized form from about 10 to about 40 percent by weight of these N-alkoxyalkyl-substituted amides with a preferred range being from about 20 to about 30 percent.

Alpha, beta-ethylenically unsaturated carboxylic acid monomers which are preferably utilized in forming the acid units of the interpolymer include acrylic or methacrylic acid but itaconic acid, crotonic acid, maleic acid and half esters of maleic and fumaric acids may also be used. In the half esters, one of the carboxyl groups is esterified with an alcohol, the identity of which is not significant so long as it does not prevent polymerization or preclude the desired utilization of the product. Butyl hydrogen maleate and ethyl hydrogen maleate are examples.

The interpolymer may contain in polymerized form from about 5 to about 20 percent by weight of such acids. However, for greater efficiency in solubilization and overall properties, it is preferred that from 7 to 15 percent of such acids be present in the interpolymer.

As indicated, the interpolymer, in addition to the substituted amide and acid units, contains units of at least one other monomer containing a

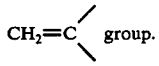 group.

The other monomer containing the

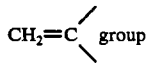 group can be any ethylenically unsaturated compound which is copolymerizable with the substituted amide and acid with the polymerization taking place through the ethylenically unsaturated linkages. These include monoolefinic and diolefinic hydrocarbons, unsaturated esters of organic and inorganic acids, esters of unsaturated acids, and unsaturated organonitriles such as acrylonitrile and the like. It is preferred, in order to provide desirable properties in the interpolymer, to utilize a combination of hardening and flexibilizing monomers. The preferred hardening monomer is styrene, but others such as vinyl toluene or alkyl methacrylates having from 1 to 4 carbon atoms can also be utilized.

The interpolymer may contain in polymerized form from about 5 percent to about 75 percent by weight of hardening monomers with a preferred range being from about 50 to about 60 percent of such monomers.

The flexibilizing monomers utilized may be one or more alkyl or substituted alkyl esters of acrylic or methacrylic acid, the alkyl groups having 1 to 13 carbon atoms in the case of acrylic esters and 5 to 16 carbon atoms in the case of methacrylic esters. Illustrative of such flexibilizing monomers are ethyl acrylate, butyl acrylate, 2-ethylhexyl acrylate, 2-ethylhexyl methacrylate, decyl methacrylate, lauryl methacrylate, and the like.

The interpolymer may contain, in polymerized form, from about 5 percent to about 75 percent by weight of such flexibilizing monomers with a preferred range being from about 20 percent to about 50 percent.

The above-described acid-containing interpolymer is prepared by conventional vinyl polymerization techniques utilizing vinyl polymerization catalysts which are well known in the art. These include the azo compounds such as alpha, alpha'-azobis(isobutyronitrile), which are the preferred catalysts herein, and the well known peroxygen catalysts such as benzoyl peroxide, lauroyl peroxide, cumene hydroperoxide and the like. Other useful catalysts include tertiary-butyl perbenzoate, tertiary-butyl pivalate, isopropyl percarbonate and similar compounds. In addition, the interpolymer may be prepared, if desired, by conventional emulsion polymerization techniques. In that event, it is often desirable and preferred to employ water-soluble initiators such as hydrogen peroxide, ammonium persulfate, potassium persulfate and other similar persulfates.

As indicated, the above-described acid-containing interpolymer is adapted to be dissolved or dispersed in an aqueous medium with the aid of a base. This is accomplished by neutralizing all or a portion of the carboxylic acid groups of the interpolymer with an appropriate base. Virtually any basic compound can be utilized for that purpose, including inorganic bases such as alkali metal hydroxides and organic bases such as amines. However, the preferred basic compounds utilized herein are the monomeric amines. These may be any of the amines used for solubilizing purposes known heretofore, including ammonia, ethylamine, butylamine, dimethylamine, cyclohexylamine, morpholine, monoethanolamine, diethanolamine, dimethylethanolamine, diethylethanolamine and the like. Of these amines, dimethylethanolamine is preferred.

The amount of amine employed in neutralizing the acid groups of the interpolymer may vary considerably. However, it is preferred in this invention that the amount of amine employed be sufficient to neutralize at least about 40 percent of the theoretical quantity of acid groups present in the interpolymer.

Several procedures may be employed in dispersing the interpolymer in the aqueous medium. One known method is to first form the interpolymer in solution by polymerizing the monomers in a water-miscible volatile organic solvent or mixture of such solvents, following which the acid groups of the resultant interpolymer are neutralized with the basic compound, if desired, in the presence of water, to form the salt or partial salt of the interpolymer, thus enabling the interpolymer to be dissolved or dispersed in the aqueous medium. In this method, any excess organic solvent utilized in the polymerization process can be removed from the aqueous medium by distillation if desired. Alternatively, in the practice of this invention, the monomers can first be polymerized in a mixture of a water-miscible volatile organic solvent and the water-soluble or water-dispersible polyether or polyester polyols (described hereinafter) or in the water-soluble or water dispersible polyether or polyester polyol alone, following which the acid groups of the resultant interpolymer are neutralized to form the salt or partial salt of the interpolymer, thereby rendering the interpolymer dissolvable or dispersible in the aqueous medium. These alternative procedures have the advantage of eliminating the necessity for a separate distillation step to remove any excess organic solvent. Still further as indicated above, the interpolymer, if desired, can be prepared in aqueous medium by conventional emulsion polymerization techniques.

Various water-miscible or water-soluble organic solvents can suitably be employed in producing the water-soluble or water-dispersible interpolymer. Thus, the ether type alcohols such as ethylene glycol monobutyl ether (i.e., butyl Cellosolve), ethylene glycol monoethyl ether (i.e., ethyl Cellosolve), diethylene glycol monomethyl ether, diethylene glycol n-butyl ether (i.e., butyl Carbitol) and the like may be advantageously employed. In addition, lower alkanols having 2 to 4 carbon atoms such as ethanol, propanol, isopropanol, butanol and the like can be used. Mixtures of the ether type alcohols and lower alkanols are often advantageously employed. Minor proportions of hydrocarbon solvents such as xylene, toluene and the like may also be included.

The liquid portion of the coating compositions herein may contain from about 60 to about 100 percent by weight of water and correspondingly from 0 to about 40 percent by weight of organic solvents, such as those mentioned above, with a preferred ratio being from 80 to 90 percent by weight of water and 10 to 20 percent by weight of organic solvent. In any case, at least about 60 percent by weight of the liquid medium will be water.

B. The Water-Soluble or Water-Dispersible Polyol Component

As indicated above, in addition to the previously-described interpolymers, the organic binder of the water-based coating compositions of the invention contains a non-volatile, water-soluble or water-dispersible polyether polyol or polyester polyol having a molecular weight of at least 300.

Polyether polyols or polyester polyols which can suitably be employed in the binder of the compositions of this invention are those having a molecular weight of at least 300 and which are soluble or dispersible in water. These polyols must have molecular weights of at least 300 and may have molecular weights of up to 5000 or even higher, provided they are water-soluble or water-dispersible. The preferred water soluble or water-dispersible polyether polyols or polyester polyols employed in the compositions of the invention are those having molecular weights of from about 500 to about 3000. As further stated, the polyols employed must be non-volatile. The term "non-volatile" as applied to the polyols herein means that under the curing conditions utilized, not more than about 5 percent of the polyol will volatilize, (i.e., evaporate) from the film, before the film is cured.

Subject to the above limitations, essentially any polyether polyol or polyester polyol can be employed in the compositions of the invention, with the preferred polyols being polyether polyols which are the reaction products of an alkylene oxide, preferably ethylene oxide or 1,2-propylene oxide, with a polyol such as glycerine, trimethylolpropane, hexanetriol, pentaerythritol, sorbitol, sucrose or the like. The particularly-preferred polyether polyols used in the invention are the reaction products of 1,2-propylene oxide with a mono- or disaccharide such as sucrose, dextrose, lactose and alphamethyl d-glucoside.

Polyethers of mono- and disaccharides are known in the art. One preferred method of preparing these sugar-containing polyether polyols (e.g., sucrose polyether polyol) is to first dissolve the saccharide in water, following which an oxyalkylation catalyst is added, and the alkylene oxide addition is carried out to that point at which the saccharide-alkylene oxide reaction product is a liquid at room temperature. At this point, substantially all of the water present is removed by distillation or other means, and the balance of the alkylene oxide is added until the desired polyether polyol is obtained. For a detailed description of these saccharide-containing polyether polyols and their method of preparation, see U.S. Pat. No. 3,085,085, issued Apr. 9, 1963.

Polyester polyols which are suitable for use in the instant invention are formed from the polyesterification of organic polyols and organic polycarboxylic acids or acid anhydrides. The polyols and polycarboxylic acids or anhydrides are often aliphatic or aromatic diols and diacids but it is advantageous in some cases to employ polyols or polycarboxylic acids having hydroxyl or carboxyl functionalities of 3 or more.

The preferred polyols employed in forming the polyesters are diols and triols.

Diols which may be employed in making the polyester polyol include alkylene glycols such as ethylene glycol, propylene glycol, butylene glycol, hexylene glycol, and neopentyl glycol and other glycols such as hydrogenated Bisphenol A, cyclohexane dimethanol, caprolactone diol (for example the reaction product of caprolactone and ethylene glycol), hydroxyalkylated bisphenols, and polyether glycols such as poly(oxytetramethylene) glycol and the like. In addition, many other diols of various types can be utilized.

Triols which are preferably employed in making the polyester polyols include compounds such as trimethylolpropane, trimethylolethane, 1,2,2-propane-triol, 1,2,4-butanetriol, polycaprolactone triols and triols based on adducts of propylene oxide and glycerine.

Polycarboxylic acids which may be employed in making the polyester polyol consist primarily of monomeric carboxylic acids or anhydrides having 2 to 14 carbon atoms per molecule. Among the acids which are useful are phthalic acid, isophthalic acid, terephthalic acid, tetrahydrophthalic acid, hexahydrophthalic acid, adipic acid, sebacic acid, maleic acid, glutaric acid, chlorendic acid, tetrachlorophthalic acid, and other dicarboxylic acids of varying types.

The polyester may include minor amounts of monobasic acids, such as benzoic acid, and there may also be employed herein polycarboxylic acids such as trimellitic acid and tricarballylic acid (where acids are referred to above, it is understood that the anhydrides of those acids which form anhydrides can be used in place of the acid.) It is preferred that the polyester include an aliphatic dicarboxylic acid as at least part of the acid component. It should be noted that if both tricarboxylic acids and triols are used in the same polyester, care must be exercised else gelation will occur and the polyester will be so highly crosslinked that it will not be water soluble or water dispersible. In general high contents of triols rather than the tricarboxylic acids are favored.

The polyester polyols useful herein also include polyester amide polyols, and polyhydric compounds having polyester structures but not formed from the reaction of a polyol and a polycarboxylic acid. Examples of this latter type includes the so-called lactone polyesters, such as the polycaprolactone polyols described in U.S. Pat. No. 3,169,945 to Hostettler et al.

The water-soluble or water-dispersible polyether or polyester polyols used in the water-based coating compositions of this invention provide a number of advantages thereto. First, there polyols participate in the curing of the compositions by being cross-linked through their hydroxyl functionality. Therefore, these polyols are incorporated into the film formed by curing the composition. More importantly, the use of these polyols in the compositions of the invention produces water-based coatings in which solvent and water-popping and sagging are eliminated or substantially reduced. This is of great importance since solvent and water-popping and sagging have been serious problems with water-based coatings prior to the instant invention.

The amounts of these polyether or polyester polyols which may be included in the binder of the compositions of the invention vary considerably, depending upon the thickness of the coating desired, humidity conditions and the like. In general, from about 5 percent to about 50 percent by weight of the polyol based upon total binder solids may be included with a preferred amount being from 10 percent to 25 percent.

In addition to the thermosetting film-forming organic binder and the aqueous medium, the water-based coating compositions of this invention may contain various additives commonly utilized in the coatings industry. Thus, these compositions may contain conventional pigments such as titanium dioxide, aluminum, silica, lead silica chromate, carbon black, talc, barium sulfate and the like. Colored pigments such as cadmium red, cadmium yellow, phthalocyanine blue, phthalocyanine green, chrome green, toluidine red, hydrated iron oxide, and the like may be included if desired. Also, other adjuvants may be incorporated, such as dispersing agents, surface-active agents, adhesion promoting agents, melting agents, flow agents, antioxidants, and the like.

The water-based coating compositions of the invention can be applied by methods conventionally employed in the coatings industry, such as brushing, dipping, flow coating, roll coating, spraying and the like.

After application, the compositions are ordinarily dried and cured by baking at elevated temperatures to produce a hard, thermoset film. The precise baking schedule will depend upon the particular composition utilized, the nature of the substrate, thickness of the coating and the like. However, it should be observed that the baking temperature employed must not be so high as to volatilize the polyol component before it can be crosslinked into the film. Thus, the baking temperature usually should not exceed about 500° F. unless for very short periods. The normal curing time may conveniently range from 5 to 45 minutes for usual industrial situations. In coil coating applications, baking schedules of short times and high temperatures can be used.

The water based coating compositions of the invention may have solids contents ranging from 25 to 70 percent by weight. Solids include the interpolymer, polyol, aldehyde condensation resin and any desired pigmentation.

EXAMPLE A

This example illustrates the preparation of an aqueous dispersion of an amide interpolymer employed in the compositions of this invention.

To a reactor equipped with reflux condenser, heating means, stirrer, thermometer and nitrogen inlet were charged 130.0 grams of ethylene glycol monoethyl ether (hereinafter ethyl Cellosolve) and 325.0 grams of a feed mixture consisting of 58.6 percent styrene, 15.0 percent methyl methacrylate, 6.7 percent acrylic acid, 19.7 percent N-(butoxymethyl)acrylamide (hereinafter NBMA) and 3.0 percent tertiary dodecyl mercaptan. The charged mixture was then heated under nitrogen to reflux (about 125° C.). After reflux had begun, an additional 1063.0 grams of the above feed mixture and 12.0 grams of alpha, alpha'-azobis(isobutyronitrile) were added to the rector over a period of 3 hours. Following this addition, a total of 5.1 grams of tertiary butyl perbenzoate and 22.5 grams of ethyl Cellosolve were added to the reactor in 3 equal increments (i.e., 1.7 grams of tertiary butyl perbenzoate and 7.5 grams of ethyl Cellosolve) over a period of about 5 hours with the first two increments being added at 15. hour intervals. At the end of this period, the reactor was cooled to room temperature. After approximately one hour, the reaction mixture was heated to approximately 96° C. and 39.9 grams of dimethylethanolamine was added to the reactor. After this addition heating was continued until a temperature of 108° C. was attained and then 12.0 grams of one percent Triton X-100, a non-ionic alkarylethoxyethanol surfactant available from Rhom and Haas, was added to the reactor. Following the addition of the surfactant, 1845.0 grams of deionized water was added to the reaction mixture.

The resultant amide interpolymer dispersion had a total solids content of 34.7 percent, an acid value of 15.7 and a viscosity of 1850 centipoises. The aqueous medium consisted of 86.3 percent water and 13.7 percent organic solvents.

EXAMPLE 1-2

These examples illustrate the effect of the polyol component on the water-popping and solvent popping characteristics of water-based coating compositions. In these examples a control coating composition (Example 1) was first formulated from the interpolymer dispersion of Example A. Then a test composition was prepared by adding a polyether polyol to a sample of the control composition.

The control and test compositions were prepared utilizing standard paint mixing techniques. Composition formulations and properties were as follows:

| Ingredients | Parts by Weight | |
|---|---|---|
| | Example No. 1 (Control) | Example No. 2 |
| Interpolymer dispersion of Example A | 146.5 | 109.0 |
| Pigment paste[(a)] | 113.0 | 113.0 |
| Sucrose polyether polyol[(b)] | — | 37.5 |
| Total | 259.5 | 259.5 |
| Interpolymer/polyol binder ratio | 100/0 | 50/50 |
| Total solids (percent) | 56.5 | 56.5 |
| Viscosity (seconds) #4 Ford Cup | 18 | 18 |

[(a)]A pigment paste consisting of 66.7 percent titanium dioxide, 25.9 percent water, 3.8 percent ethylene glycol, 3.2 percent Triton X-100 alkarylethoxyethanol surfactant, 0.3 percent NOPCO JMY, an antifoaming agent available from Nopco Chemical Company and 0.1 percent Tamol 731, a pigment wetting agent available from Rohm & Haas Company.
[(b)]A 100 percent solids sucrose polyether polyol, having a viscosity of 6500 centipoises and a hydroxyl value of 325, formed by reacting 1.0 mole of sucrose with 20.5 moles of propylene oxide.

The above compositions were evaluated for sagging characteristics by spray applying samples thereof onto vertical steel panels at a film thickness of 1.2 mils. In evaluating the compositions utilizing this test, the control composition, Example 1, sagging badly, virtually running off the panel whereas the test composition, Example 2, showed no sagging.

The compositions were evaluated for solvent or water popping by spray applying, at 80° F. and 50 percent relative humidity, samples of the compositions on steel panels, allowing a 5 minute flash period and then baking the panels in an oven for 10 minutes at 300° F. Popping characteristics were measured by determining the dry film thickness which could be obtained without popping. Using this test, the control composition, Example 1, could be sprayed to obtain a dry film thickness of 1.6 mils before popping was observed while the test composition could be sprayed to obtain a dry film thickness of 2.2 mils without popping.

As the above examples illustrate, the addition of a polyol having the characteristics described herein to the binder of the aqueous coating compositions of the invention dramatically increased resistance to solvent or water-popping and sagging.

While specified interpolymers and polyols have been employed in the examples, these materials can be replaced with various materials described in the specification and similar results will be obtained. Thus, for example, an interpolymer derived from N-(butoxymethyl)-methacrylamide, methacrylic acid and other ethylenically unsaturated monomers may be utilized. Also, the sucrose polyether polyol emloyed in the examples can be replaced with various other water-soluble or water-dispersible polyether or polyester polyols. For example, the sucrose polyether polyol can be replaced with a polycaprolactone polyol having a molecular weight of about 530 formed by reacting 1.0 moles of diethylene glycol with 3.7 moles of epsilon-caprolactone.

According to the provisions of the patent statutes, there have been described above the invention and what are now believed to be its best embodiments. However, within the scope of the appended claims, it is to be understood that the invention can be practiced otherwise than as specifically described.

We claim:

1. A water-based coating composition having reduced solvent popping, water-popping and sagging characteristics comprising a thermosetting, film-forming organic binder dispersed in an aqueous medium containing at least 60 percent by weight of water, said organic binder consisting essentially of:
  A. an interpolymer consisting essentially of the interpolymerization product of:
    1. from about 10 percent to about 40 percent by weight of an N-alkoxyalkyl-substituted amide represented by the structure:

$$R'-\overset{O}{\underset{\|}{C}}-NH-CH_2-O-R,$$

wherein R' is an aliphatic hydrocarbon radical containing from 2 to 6 carbon atoms and having a single terminal polymerizable alpha, beta-ethylenically unsaturated group and R is a lower alkyl radical containing from 1 to 8 carbon atoms,
    2. from about 5 to about 20 percent by weight of an alpha, beta-ethylenically unsaturated carboxylic acid, and
    3. at least one other ethylenically unsaturated monomer containing a

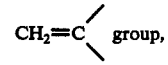 group, wherein said interpolymer is solubilized by neutralizing at least a portion of the carboxylic acid groups thereof with a base; and
  B. from about 5 percent to about 50 percent by weight of interpolymer solids of a non-volatile water-soluble or water-dispersible polyether polyol or polyester polyol having a molecular weight of at least 300.

2. The water-based coating composition of claim 1 wherein the N-alkoxyalkyl-substituted amide is N-(butoxymethyl)acrylamide or N-(butoxymethyl) methacrylamide.

3. The water-based coating composition of claim 1 wherein said alpha, beta-ethylenically unsaturated carboxylic acid is acrylic acid or methacrylic acid.

4. The water-based coating composition of claim 1 wherein the other monomer containing a

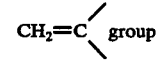 group is a mixture of hardening and flexibilizing monomers.

5. The water-based coating composition of claim 4 wherein the hardening monomer is of styrene, vinyl toluene or an alkyl methacrylate having from 1 to 4 carbon atoms.

6. The water-based coating composition of claim 4 wherein the flexibilizing monomer is an alkyl ester of acrylic acid or an alkyl ester of methacrylic acid, and wherein the alkyl groups have from 1 to 13 carbon atoms in the case of the acrylic esters and from 5 to 16 carbon atoms in the case of methacrylic esters.

7. The water-based coating composition of claim 1 wherein said base is a monomeric amine.

8. The water-based coating composition of claim 1 wherein said base is dimethylethanolamine.

9. The water-based coating composition of claim 1 wherein said polyether polyol is a sucrose polyether polyol.

10. The water-based coating composition of claim 1 wherein said polyester polyol is a polycaprolactone polyol.

* * * * *